Jan. 14, 1958    R. S. HOWELLS    2,820,208
BATTERY TERMINAL ANTI-CORROSION DEVICE
AND BATTERY TERMINAL PROTECTOR
Filed April 22, 1955
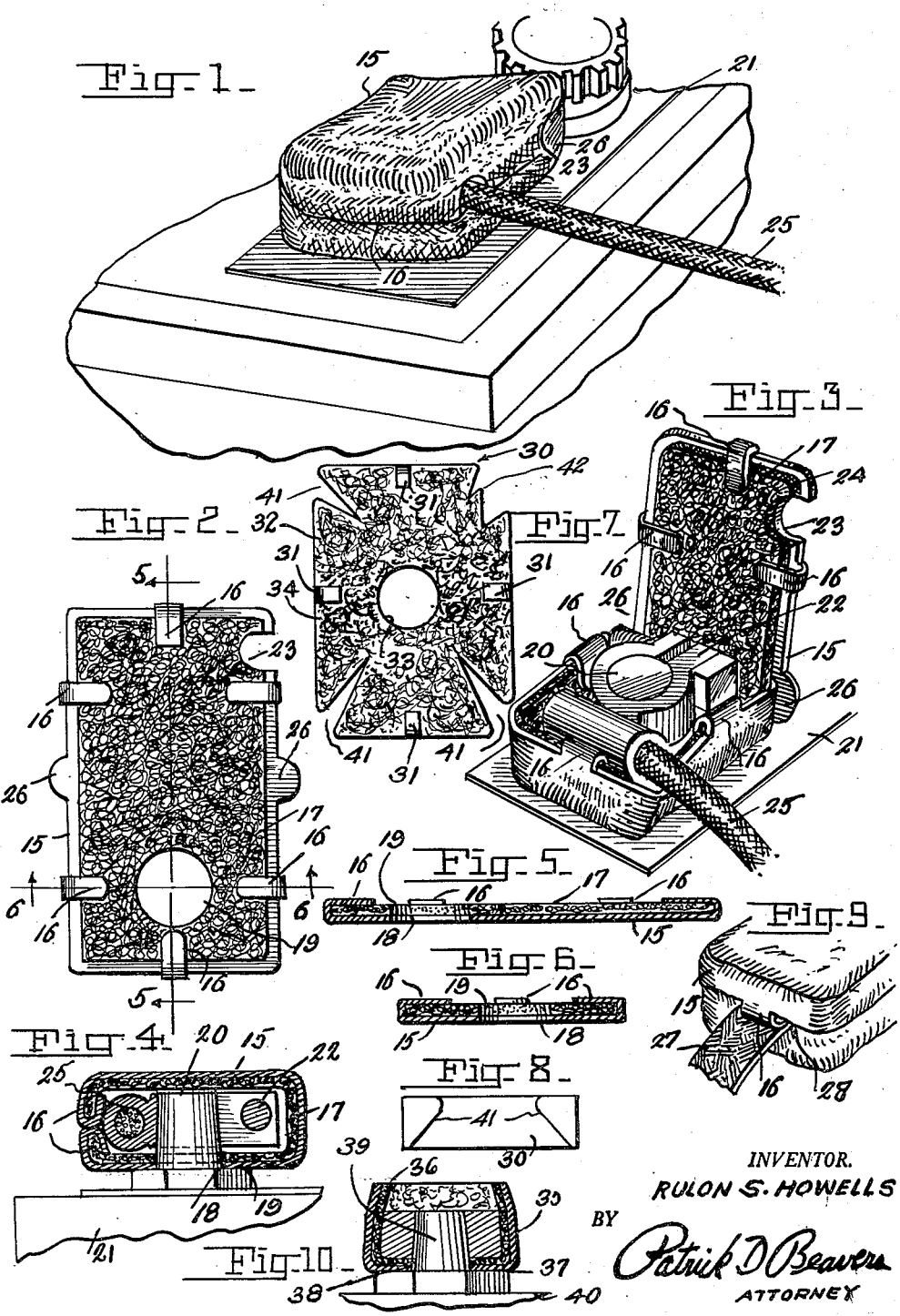
INVENTOR.
RULON S. HOWELLS
BY
Patrick D. Beavers
ATTORNEY

United States Patent Office 2,820,208
Patented Jan. 14, 1958

2,820,208

BATTERY TERMINAL ANTI-CORROSION DEVICE AND BATTERY TERMINAL PROTECTOR

Rulon S. Howells, Salt Lake City, Utah

Application April 22, 1955, Serial No. 503,260

1 Claim. (Cl. 339—116)

This invention relates to a battery terminal anticorrosion and protection assembly that will provide a shield or guard for battery posts, terminals and cable connections, on electric storage batteries.

An object of the invention is to provide a device of this character that may be applied either to the negative or positive posts of a battery.

Another object of the invention is to provide a device of this character that is provided with a piece of chemically saturated felt to combat corrosion of the cable, cable terminal, and battery post.

This device, by preventing corrosion which usually starts between the battery post and the cable terminal, protects the electrical system of the automobile, truck, tractor, etc. from "over-loads" and "under-loads" of current which would otherwise occur if corrosion on the terminals was affecting the free flow of electricity to and from the battery. This device protects the voltage regulator by preventing corrosion from impeding the flow of electricity which affects the points of the voltage regulator.

This invention is a device for applying corrosive preventative materials to battery posts and cable terminals, and keeping said corrosive preventative materials always and constantly in contact with the metal—battery posts and cable terminals.

With the above and other objects and advantages in view the invention consists of the novel details of construction, arrangement and combination of parts more fully hereinafter described, claimed, and illustrated in the accompanying drawing in which:

Fig. 1 is a perspective view of one form of the invention as applied to the positive terminal of a battery;

Fig. 2 is a bottom plan view of the form of the invention shown in Fig. 1;

Fig. 3 is a perspective view of the form of the invention shown in Fig. 1 in open position before it has been bent to the position of Fig. 1;

Fig. 4 is a transverse sectional view of the form of the invention of Fig. 1;

Fig. 5 is a longitudinal sectional view on the line 5—5 of Fig. 2;

Fig. 6 is a transverse sectional view on the line 6—6 of Fig. 2;

Fig. 7 is a bottom plan view of another form of the invention;

Fig. 8 is an end view of the form of the invention shown in Fig. 7 in folded position;

Fig. 9 is a fragmentary perspective view of the form of the invention shown in Fig. 1 in use with the negative connection for the battery; and Fig. 10 is a transverse sectional view of another form of the invention.

Referring more in detail to the drawing wherein like parts are designated by like reference numerals, the device embodying the invention is shown to comprise a rectangular shaped sheet 15 which is made of soft lead. The sheet 15 is provided with outwardly extending ears 16 which when bent into the position, as shown in Fig. 2, will retain a rectangular shaped sheet of felt 17 in contact with the sheet 15.

The sheet 15 and felt 17 are provided with alined openings 18 and 19, respectively, to receive the terminal 20 of a battery 21.

When the cable connection 22 is positioned on the terminal 20 in contact with the felt 17, as shown in Fig. 3, the sheet 15 is manually bent to conform to the shape shown in Fig. 1. One long edge of the sheet 15 is provided with a semi-circular notch 23 and the felt 17 is provided with a similar shaped alined notch 24 to receive the cable connection 25, Fig. 1, which is connected to the clamp 22. Outwardly extending projections 26, formed on the long edges of the sheet 15 at approximately the center thereof, are bent around the short sides of the sheet 15 when it has been folded as shown in Fig. 1.

In Fig. 1 the device is applied to the positive cable 25, in Fig. 9 it is applied to a negative cable 27 and the notch 28 is provided in the short edge of the sheet 15.

The invention therefore comprises a complete shield or guard for battery terminals and cable connections therefor which is formed of one integral piece of soft thin lead lined with saturated felt which fits over and around the battery post. After the cable terminal connection is in place around the battery post and tightened, the shield or guard is bent up on the outside snugly around the cable terminal connection to form a tight seal with the saturated felt. This felt is in contact with the cable terminal connection and on the underside the saturated felt is also in contact with the battery post, and cable terminal so that the area of contact between the cable terminal connection and the battery post is protected from acid vapors or fumes and is kept constantly moistened by the oils and chemicals from the saturated felt. The non-corrosive thin lead covering serves to keep the saturated felt always in place. The lead covering made of soft pliable lead permits it to be bent easily, thus the device can be removed and re-used if desired.

The entire battery post and cable terminal connector, or clamp, is thus covered and protected from acid or electronic process, or a combination of both, acting upon the metals causing corrosion, which deteriorates bolts, terminals and cables.

This device is made to fit around, underneath and over both positive and negative cable terminals or clamps and battery posts.

This device also acts as a shield to protect the battery posts and cable terminals from excessive heat from the engine which also has a tendency to increase corrosion.

This device prevents corrosion between cable terminal and battery post.

This device also prevents outside corrosion around battery posts and cable terminals.

In the form of the invention shown in Figs. 7 and 8 a different shaped sheet 30 of soft lead is used.

Ears 31 are provided on the peripheral edge of the lead sheet 30 to retain a similar shaped piece of chemically saturated felt 32 in contact with the lead sheet 30. The lead sheet is provided with a central opening 33 and the felt 32 is provided with a central opening 34. The openings are in alinement with each other to receive a battery post.

When the lead sheet 30 with saturated felt 32 has been placed on the battery in contact therewith and the cable terminal has been placed on the battery post, and tightened, the lead sheet and felt are bent upwardly around the clamp and terminal, as shown in Fig. 8. In this form of the invention only the bottom and sides of the battery post and cable terminal are covered.

The lead sheet 30 is provided at three of its corners with V-shaped cutouts 41 and these cutouts permit the folding of the sheet 30, as shown in Fig. 8. A cutout 42, somewhat in the shape of a double V, is positioned in the remaining corner of the lead sheet 30. The cutout 42 permits the positive battery cable to extend through the folded sheet when it is in the position, as shown in Fig. 8. The flap formed by the cutouts 41 lap over the corners of the lead sheet when it is folded as shown in Fig. 8. The felt 32 may also be provided with similar cutouts to permit the folding of the felt when the lead sheet 30 is folded as previously described.

This sheet when folded around the battery terminal forms a complete cup of equal height all around the terminal, thus permitting the chemically saturated felt, that it holds in position, to contact all sides of the terminal to an equal height.

Fig. 10 shows a cover 35, but in this instance the felt 36 is held in contact with the cover 35 by some suitable adhesive or outwardly extended ears of the cover that are folded over. The cover is provided with a central opening 37 and the felt is provided with a central opening 38 to receive the post 39 of the battery 40.

The last forms of the invention differ from the first form only as to shape. The latter forms performing the same functions as the first form.

It is believed that the construction and use of the device embodying the invention will be clear to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A device of the character described comprising a substantially rectangular outer sheet of thin lead having a circular opening adjacent one end thereof and a cutout portion adjacent one corner thereof, an inner sheet of felt of similar shape and of slightly less size than said outer sheet and having an opening and a cutout portion registering with the opening and cutout portion of said first sheet, inwardly extending ears formed integrally with all sides of said first sheet and bearing against the outer face of said inner sheet, and a pair of ears integrally formed centrally at either side of said outer sheet and adapted to bear against the sides of the device when the same is in folded condition.

References Cited in the file of this patent
UNITED STATES PATENTS

| | | |
|---|---|---|
| 1,728,319 | Wilson | Sept. 17, 1929 |
| 2,065,558 | Berryman | Dec. 29, 1936 |
| 2,145,135 | Ryalls | Jan. 24, 1939 |
| 2,564,810 | Martin | Aug. 21, 1951 |